United States Patent Office 2,991,394
Patented July 4, 1961

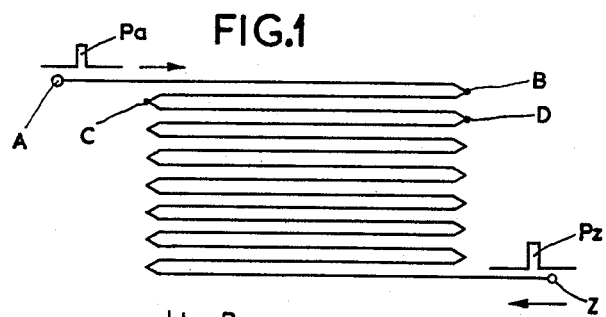
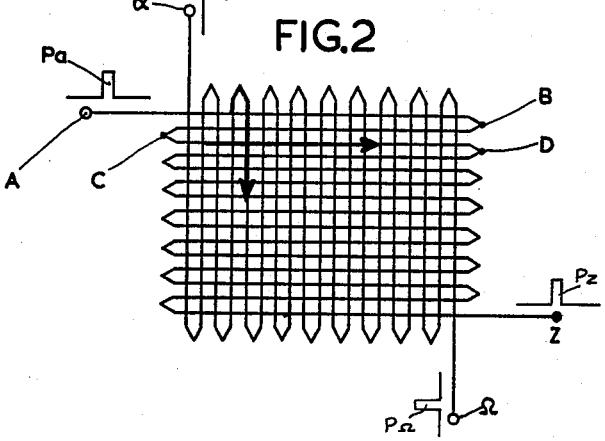
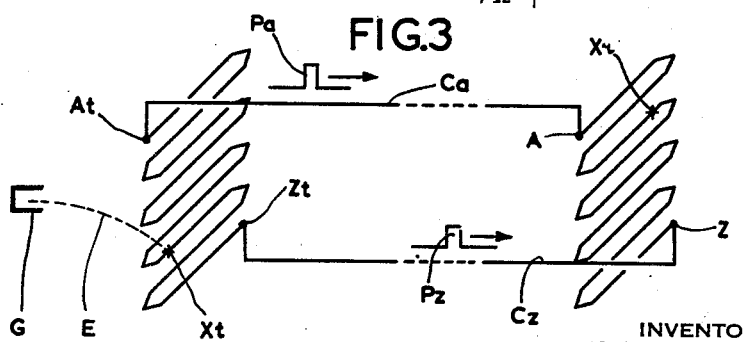

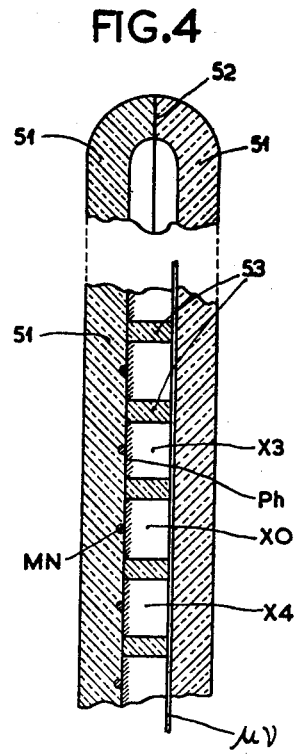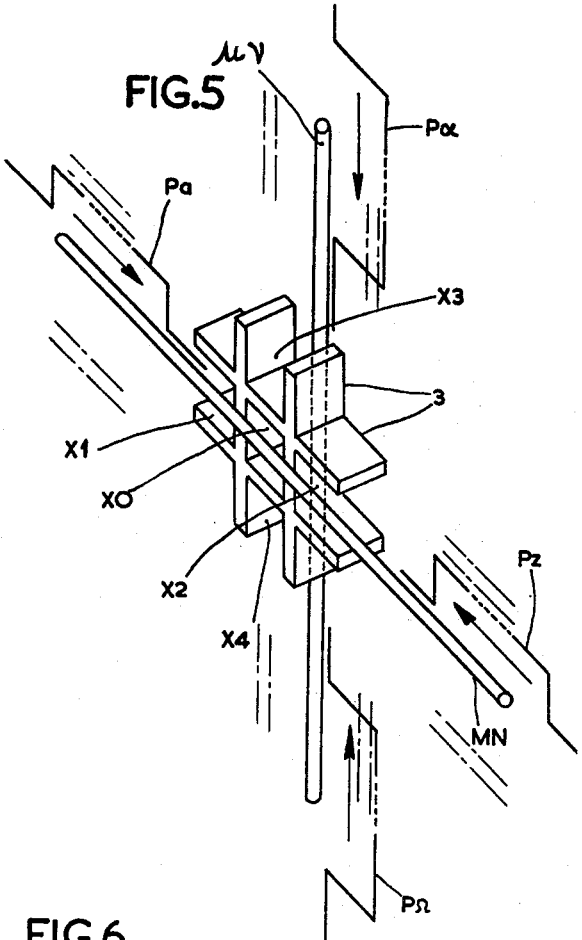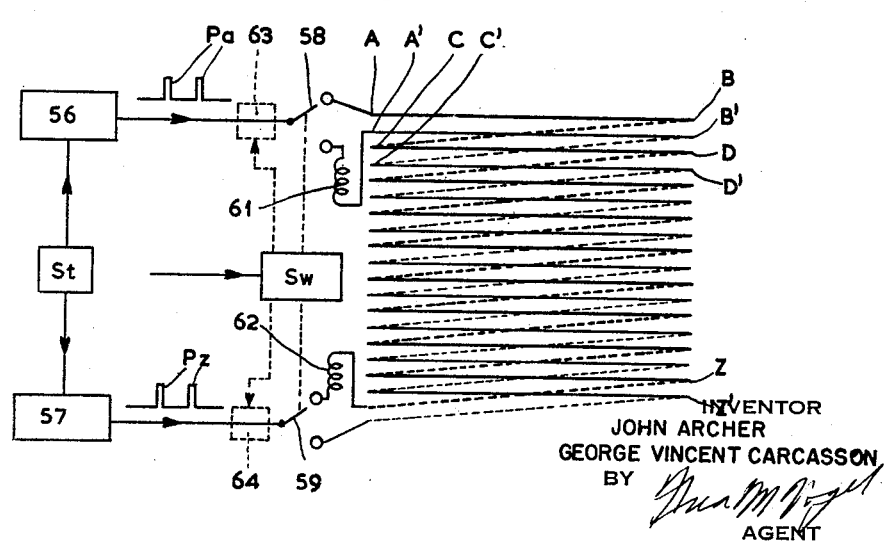

2,991,394
METHOD OF AND APPARATUS FOR POSITION-SELECTION, SCANNING AND THE LIKE
John Archer and George Vincent Carcasson, London, England, assignors, by mesne assignments, to North American Philips Company, Inc., New York, N.Y., a corporation of Delaware
Filed Dec. 20, 1955, Ser. No. 554,338
Claims priority, application Great Britain Dec. 23, 1954
16 Claims. (Cl. 315—169)

This invention relates to methods of position-selecting, scanning and the like and to apparatus for performing such operations. Such apparatus and methods may be applied to television systems, information storage devices, switching systems and generally where it is required to select from a plurality of positions or elements or to scan a plurality of positions or elements.

According to one aspect of the invention, apparatus for selecting from a plurality of positions or elements or scanning a plurality of positions or elements, comprises a delay line system having sections each associated with one of said positions or elements, at least two input terminals connected to said system, means for applying a set of pulses one to each of said input terminals for selecting one of said positions or elements, the pulses of said set being so timed in relation to each other and to their respective velocities of propagation as operatively to intercept each other at the section of the delay line system associated with the desired position or element, and means at said position or element adapted to discriminate between the combined effect of said pulses and either of said pulses separately.

According to a further aspect of the invention, apparatus for selecting from a plurality of positions or elements or scanning a pluralty of positions or elements, comprises at least two delay line paths for transmitting pulses in different directions, each path having sections each associated with one of said positions or elements, an input terminal for each path, and means for applying a set of pulses one to each of said input terminals for selecting one of said positions or elements, the pulses of said set being so timed in relation to each other and to their respective velocities of propagation as operatively to intercept each other at corresponding sections of the respective delay line paths associated with the same desired position or element and means at said position or element adapted to discriminate between the combined effect of said pulses and either of said pulses separately.

The positions or elements may for example be picture elements in the case of television, picture telegraphy and like applications, or they may be information storage elements e.g. so-called square-loop magnetic cores of the kind used in matrix storage systems. In some applications, e.g. in television applications, selection may be required in a sequential or consecutive manner constituting a scanning process, in other applications, e.g. in some information storage systems, random selection of individual positions or elements may be required.

With the exception of a modification to be described later, each set of two or more pulses is used to select one single position or element. The interception by which this is effected is an operative one in the sense that the pulses do not necessarily meet on a common line section although they must pass through a common region or device in which they can, by virtue of their polarities or other properties exercise a combined influence to cause a selection. Thus the input terminals may be the opposite ends of a single delay line providing one transmission path for pulses fed to one input terminal and a second path in the opposite direction for pulses fed to the other input terminal. On the other hand the apparatus may comprise a first line, a second line separate from said first line but operatively intersecting said first line at a plurality of sections thereof each corresponding to a position or element, and means for supplying a set of at least two pulses, one to an end of each line, so timed that the pulses of a set intercept each other at one desired position or element.

Depending on the type of application, delay lines of various kinds having differing velocities of propagation may be used, and in addition, the pulses of a set are not necessarily made to travel at the same velocity. Continuous lines, i.e. lines having distributed constants, may be used, in which case each section is a small portion of the continuous line which is identified by its association with a particular position or element. In other cases, delay lines having lumped constants may be used in which the sections are physically distinct and may for example be identified by individual tapping points. For some applications e.g. in the information storage or switching fields, the lines may be lines having slow velocities of propagation of the order of 5000 metres per second, for example acoustic lines excited by pressure pulses applied magnetostrictively or electrostrictively. In faster applications electromagnetic delay lines are used. Depending on the effective velocities required, these lines may be used in conjunction with media having permeabilities and/or dielectric constants greater than unity. The conductors thereof may be plain and linear or be compressed e.g. in the form of a helix or by small alternate staggered bends in a plane.

The invention in its various aspects will be better appreciated from the more detailed description which follows, and in reference to the drawing, wherein:

FIG. 1 shows a delay line grid having two opposed input terminals;

FIG. 2 shows a delay line grid having four input terminals;

FIG. 3 is a schematic representation of a transmitter in combination with a delay line grid;

FIG. 4 shows one specific embodiment of the delay line grid employing gas discharge elements;

FIG. 5 is an expanded isometric view of one part of FIG. 4; and

FIG. 6 shows another embodiment of the invention.

The principles underlying the invention will now be explained more fully with reference to FIGS. 1 to 3. These FIGURES are schematic and, although applicable e.g. to information storage and other devices, it has been found convenient to describe them in relation to applications such as television or picture telegraphy in which the requirements are more stringent, e.g. owing to the additional need for luminous display and modulation. Thus the following discussion of FIGS. 1 to 3 will assume the existence of a light source with localized excitation means therefor, which in practice could comprise a phosphor screen with its picture elements constituting the positions or elements to be selected by excitation due to individual pulse interceptions.

FIG. 1 shows a zig-zag folded conductor constituting a delay line grid and having input terminals A and Z. The area covered by the grid corresponds to the picture area, and it will be assumed first by way of example that each of the parallel grid lines corresponds to or is associated with a row of picture elements.

With this arrangement of FIGURE 1 it is possible to feed a pair of pulses, one to each terminal of the grid, with such a time or phase relationship that they will intercept each other at a predetermined point on the grid, i.e. at the location of a selected picture element. Thus for example if two pulses Pa and Pz are exactly simultaneous, they will intercept each other at the centre of the grid and, therefore, will select the central picture element. On the other hand, if pulse Pa is fed to terminal A before pulse Pz is fed to terminal Z, pulse Pa will obviously traverse a greater length of line and the pulse interception will occur somewhere in the lower half of the picture or grid.

Prima facie, such a plain flat grid might appear unsuitable for an interlaced line and frame raster, but it will be appreciated that production of such a raster of discontinuous form merely requires appropriate phasing of the pairs of pulses determining successive picture elements. Thus the pulse phasing will change in a continuous progression in one direction during scanning of the first grid line AB by successive pairs of pulses. This will be followed by an abrupt change in phasing in order to pass with a rapid flyback to point C, with a subsequent gradual progression in the same direction for scanning the third grid line CD, and so forth. At the end of the first frame (i.e. the "odd" lines) a drastic change in phasing will cause the next pair of pulses to select point C, after which a continuous progression of phase changes will effect the scanning of the first "even" line (CB), but the direction of such progression will be opposite to that of the "odd" lines merely because, in the zig-zag formation chosen, the grid lines corresponding to the "even" lines of the raster (CB etc.) run in a direction opposite to that of the "odd" grid lines (AB, CD etc.).

In an alternative arrangement, the grid may comprise a number of grid lines double that of the lines of the raster, only one half of which grid lines are utilised, e.g. all the "forward" lines such as AB, CD etc. In this case the alternate "return" grid lines such as BC may be on a separate plane spaced rearwardly away from the screen, and grid line CD will correspond to the first "even" line of the raster instead of the second "odd" line.

For application to television with a line-and-frame raster, the system presupposes prima facie the existence at the receiver of circuitry for generating trains of pulses Pa, Pz with the required cyclical changes in phasing, such circuitry replacing the normal sawtooth time-base circuitry.

However, such pulse generating and timing circuitry is only necessary when the signals received consist of an amplitude-modulated video signal of conventional type, and can be dispensed with if the pulses (or the information determining their phasing) are received from the transmitter.

With transmission of individual pulses, reconstitution of the image at the receiver can rely entirely on transmitted signals, without any synchronizing or time-base circuitry at the receiver. In fact, the problem of synchronism would not arise since each picture element is positively and separately identified by the timing or phasing of pulses received from the transmitter.

Such advantages have been offered in part by prior television proposals for velocity modulation and by certain proposals to transmit the deflection waveforms, but in either case accuracy of reproduction depended critically on constancy of signal strength and signal quality. The present proposal offers the added possibility of complete and individual identification of each picture element, with the degree of independence from interference or changes in signal strength that is normally associated with pulse modulation.

These possibilities are illustrated graphically by the simplified diagram of FIGURE 3, in which a delay line grid AZ similar to that of FIGURE 1 reconstitutes a picture from pulse signals received over two channels shown diagrammatically as conductors Ca, Cz of equal length. As in FIGURE 1, each received picture element, e.g. Xr, is identified by a pair of pulses Pa, Pz. The necessary phasing of said pulses may be effected at the transmitter by a corresponding delay-line grid At—Zt operating in an inverse manner. For example, the transmitter grid may be scanned in a discontinuous manner by an electron beam E issuing from an electron gun G and controlled by deflection means (not shown). The beam is intermittent and strikes each element of the grid for a brief interval thus depositing a charge and thereby generating on the conductor two short pulses which travel outwardly to opposite ends of the grid and thence to the channels Ca, Cz, thereby utilising both the "forward" and "backward" wave pulses. Such pulses are the pulses Pa, Pz required to identify the element Xr of the picture at the receiver, but it will be noted that the element Xt struck by the beam E must be positionally the inverse of the desired point Xr in order to provide the two pulses with paths of equal length. (The position of pulses Pa, Pz in FIGURE 3 is purely schematic and does not, of course, represent any actual position or phasing.)

Other things being equal, the band-width necessary to transmit such pulses may be considerably greater than that of a corresponding video signal of conventional type. However, there is a gain due to the total absence of line and frame synchronisation or blanking periods. Moreover, it is possible to depart radically from the line by-line method of scanning, and dot interlace sequences of varying complexity may be adopted with a view to reducing flicker or maintaining a given level of flicker with a reduced picture frequency.

There is a further possible development which has a bearing on the band-width. Television systems have been proposed in which band-width is reduced drastically by transmitting only the differences between two successive pictures. Such systems do not appear to have been successful hitherto, but a system in accordance with FIGURE 3 may open up a possibility of carrying out the difference-transmission method since each picture element is under the absolute control of the transmitter so that the picture elements which require a change in excitation may be selected without involving scanning of the other picture elements or causing changes thereat.

Turning now to the general modulation problem, modulation may be effected inter alia by pulse amplitude modulation or pulse width modulation applied to the intercepting pulses.

In the simplified arrangement of FIGURE 1, because of attenuation, it is difficult for modulation to be applied by simply varying the amplitude of the individual pairs of pulses. This is because excitation of the light source must take place only due to the combination of two pulses Pa, Pz at the point of interception, and therefore it is essential that no single pulse such as Pa or Pz should alone be liable to excite accidentally the light source in parts of the screen other than the desired picture element. And this must be true in spite of variations in pulse amplitude along the line due to attenuation (actually, the arrangement of FIGURE 1 is favourable in this respect in that the sum of the two amplitudes of pulses Pa and Pz at the point of interception is fairly constant due to compensation because the attenuations of the two pulses tend to be complementary). This problem may be solved by something in the nature of a threshold behaviour of the light source. Alternatively, e.g. in the case of a vacuum discharge device using short pulses, a holding-off bias may be provided e.g. on a separate gating control grid having an area equal to that of the delay line grid and removed during occurrence of the desired interception. In spite of either measure it may be difficult to operate by way of amplitude modulation of the intercepting pulses, but in the second case amplitude modulation signals may be applied to the gating grid. However, in some circumstances it is possible to vary the duration of the pulses so as to obtain pulse-width modulation and an example of this method is described hereinafter with reference to FIGURES 4 to 6.

Various conditions relating to pulse duration must be fulfilled to enable the arrangement of FIGURE 1 to function.

(a) There must be no spurious interceptions at unwanted parts of the screen between pulses Pa and Pz or between pulse P$a$ or pulse P$z$ and any pulse belonging to any other pair;

(b) The length of line over which the light source is excited by two pulses at their interception should not be greater than the width of one picture element, else resolution will be impaired, and (c) Each pulse interception must last for a time sufficient to allow the localized light-source excitation process to be initiated and produce a reasonable quantity of light.

Broadly, there are at least two ways of complying with condition (a).

In the first solution, the pulses are allowed to "cross over" at the point of interception and are given time to travel to the opposite ends of the grid A, Z and clear the grid before a further pair of pulses is fed to the terminals A, Z. In this case loads are connected to the two terminals to absorb the power of the pulses issuing from the grid after effecting their interceptions. The duration of this complete sweep cannot be allowed to be longer than the picture element duration of the system. However, this may restrict unduly the length of the delay line and hence the picture size unless a grid such as grid AZ is replaced by a plurality of zig-zag grids, e.g. four or six interlaced grids operated sequentially. Furthermore, with such a method, the useful or interception period is only a very small fraction of the time taken by one complete pulse sweep. For want of a better expression, it may be said that the "time utilization factor" is poor and this has also a bearing on condition (c).

The second method of complying with condition (a) is to prevent a pair of pulses from "crossing over." This may be done by absorbing the pulse energy at the point of interception of the leading edges, e.g. as illustrated by the examples of the aforesaid FIGURES 4 to 6. If this is done, several successive pairs of pulses may follow each other simultaneously on the grid towards desired interception points without the risk of spurious interceptions with pulses that have passed such points. Thus the time utilization factor may be improved materially without placing undue restrictions on the screen size.

Turning to condition (b), with a simple line system such as that of FIGURE 1, and in the absence of absorption of energy at the point of interception, this condition in effect determines the maximum pulse width, i.e. duration, that can be tolerated for a given velocity of propagation. Obviously, the smaller this velocity is, the greater will be permissible pulse duration, the ultimate limit of the latter being the picture element duration. However, with electromagnetic delay lines, attenuation problems become increasingly serious at lower velocities. On the other hand with fast lines having velocities of the order of $3 \times 10^{10}$ cm./sec. this may be impracticable where it necessitates extremely short pulses.

On the other hand, if pulse energy absorption, as described above, is employed in an effective manner, light source excitation will occur only at the point of interception even when the lengths of the line occupied by the pulses are greater than the width of a picture element. This method is used in the example of the aforesaid FIGURES 4 to 6 but in addition a second solution of this problem has been used in said example.

In this second solution of condition (b), two spaced grids are arranged on parallel planes at an angle to each other, e.g. at right angles as shown in FIGURE 2. This permits restriction of light-source excitation to a small area at a selected intersection of the two delay lines even when the pulses occupy considerable lengths of line. In addition, the picture element is selected with a greater degree of certainty than with the system of FIGURE 1 in which latter the position of an interception along a line depends solely on extreme accuracy of phasing.

Referring to FIGURE 2, the grid AZ corresponds to that of FIGURE 1, and the added grid $\alpha\Omega$ has an input tereminal $\alpha$ to which pulses P$\alpha$ are fed. The operation of the arrangement is illustrated by two arrows representing diagrammatically the direction of travel of pulses P$a$ and P$\alpha$ respectively along their grids and lengths of line occupied thereby; excitation of the light-source is confined to the selected picture element at intersection X.

Of course, lengthening of the pulse duration (and therefore of the length of delay line occupied) beyond certain limits introduces again the problem of unwanted interceptions between pulses such as P$a$, P$\alpha$. Spurious interceptions of this kind can, if spaced apart in time, be rendered ineffective in some arrangements with the aid of a holding-off bias applied over the whole grid area and removed by a gating signal as aforementioned.

In FIGURE 2 only two pulses are shown, but it is possible to treat each of the two grids in the same manner as the grid of FIGURE 1 by applying pulses to all four terminals. Thus a quadruple interception occurs at point X, and this may be advantageous in certain circumstances in that the mean amplitude of the individual pulses is only one quarter of the combined signal amplitude of the four pulses operative at point X, and this possibility is also illustrated by the example of FIGURES 4 to 6.

Condition (c) is linked with the time utilisation factor and the difficulties are similar to those relating to condition (b). One method is to employ the intercepting pulses solely or mainly to mark the desired picture element, power for illumination of the picture element being derived from a separate source, e.g. from pulses of lower voltage and longer duration operating for a subsequent period which may be as long as the picture element duration or, in some cases, materially longer than the picture element duration. Thus the marking pulses may be very short so as to avoid the risk of spurious interceptions, while at the same time the effective pulse utilization time may be much longer.

Having explained the principles underlying the invention more fully with the aid of FIGURES 1 to 3, a specific embodiment will now be described by way of example with reference to FIGURES 4 to 6. Such embodiment may be applied for example to low-definition television systems for special purposes, or to relatively high definition television or display-repeater systems using long-delay e.g. phosphor screens to allow low picture repetition rates, the latter systems being applicable, e.g. in industrial fields or for closed-circuit repeaters of a radar P.P.I. display.

The scanning will be assumed to be effected according to a line-and-frame raster comprising horizontal lines.

The example of FIGURES 4 to 6 employs gas discharge elements as the light generating means and two systems of folded fast electromagnetic delay lines arranged as grids at right angles to each other in a manner similar to that described with reference to FIGURE 2.

Means are provided whereby a breakdown in a gaseous medium sets up a localized ionized path through which the energy of the pulses may be absorbed. Under normal conditions ionization might spread or alternatively the persistence of an ionized path might render it difficult or impossible to change rapidly the location of subsequent discharges. However, to overcome this difficulty a screen plate of cellular construction is used as shown in FIGURE 4 where each square gas cell X corresponds to a picture element and is separated from all other gas spaces by partitioning. In this manner a localized break-down can be effected in one cell without thereby setting up general ionization in the system. Although in the example shown each picture element corresponds to one cell, it may be convenient to provide a plurality of similar cells for each picture element, either with random or with regular distribution.

Various devices are employed in order to fulfill the conditions (a), (b) and (c) referred to above, notably with reference to the problems of spurious pulse interceptions and time utilization factor. A set of four separate pulses is employed for each interception and the arrangement is such that no single pulse or pulse pair has sufficient amplitude to ignite a gas cell. Moreover, no single pulse has sufficient amplitude nor is its arrival time such that it can re-ignite a cell which has previously been ignited but has not had sufficient time to become de-ionized.

In FIGURE 4 the gas-filled cellular screen plate is shown diagrammatically in vertical section, the envelope thereof comprising a pair of flat generally rectangular envelope halves or plates 51 sealed together at their inturned edges 52. Each of such plates has formed on or in its inner surface, e.g. by printing techniques, flush conductors constituting together the folded delay lines. Between such plates there is located an open cellular structure 53 which need not contact the plates 51 in an absolutely air-tight manner so long as it prevents the spread of ionization. A portion of structure 53 is shown in perspective in FIGURE 5. Such structure is of insulating material and may be manufactured in large sheets and cut to size. The front plate 51 may if desired have a phosphor lining. Preferably, the inner wall surfaces of the structure 53 are partially metallized so as to screen each cell X from neighbouring cells. FIGURE 4 shows one vertical grid line $\mu\gamma$ which may in practice be a flat strip or be compressed by coiling or alternate bending, and several horizontal grid lines of a similar nature running at right angles to the plane of the drawing, the latter lines including a grid line MN and being narrow to permit outward passage of light. The description may be read in conjunction with FIGURE 2 by assuming the grid lines MN and $\mu\gamma$ to correspond to selected intermediate lengths of the delay line grids AZ and $\alpha\Omega$ respectively, each interception being obtained by a group of four pulses P$a$, P$z$, P$\alpha$, P$\Omega$ fed to the respective input terminals A, Z, $\alpha$ and $\Omega$ (FIGURE 2).

The quadruple interception method will first be described broadly. Pulses P$a$ and P$z$ are fed at appropriate instants to the ends A, Z respectively of the horizontal grid and their leading edges are timed to meet at the location of a selected gas cell X0 (FIGURES 4 and 5). The vertical grid is treated separately and has two further pulses P$\alpha$, P$\Omega$ fed to its opposite ends $\alpha$-$\Omega$ and also these pulses will be timed so as to intercept each other at the cell X0 lying at the intersection between line MN and the chosen line $\mu\gamma$ of the vertical delay line grid. The velocities of propagation and pulse-durations used are such that a pulse will occupy a length of line far longer than the side of one gas cell or picture element. However, as aforementioned, no single pulse is alone capable of initiating or maintaining a discharge in the gas, and it is also arranged that any two pulses which may effect a spurious interception are insufficient to initiate a discharge.

In order to facilitate the explanation, it will first be assumed that the picture transmission details and the display device details are approximately as follows:

*Picture transmission*

405 lines, non-interlaced, 1 frame each four seconds. On a basis of 240,000 picture elements per frame this allows a picture element scanning time of 16 $\mu$seconds. This time is sufficient to allow substantial deionization of any one previously ignited gas cell prior to reignition of another gas cell.

*Display device*

(a) Gas cell striking voltage=100 volts.
(b) Gas cell burning voltage=75 volts.
(c) Amplitude of each of pulses P$\alpha$, P$\Omega$ (same polarity)=40 volts.
(d) Amplitude of each of pulses P$a$, P$z$=15 volts (polarity opposite to that of P$\alpha$, P$\Omega$).
(e) Picture dimensions=180 cm. x 250 cms. approximately.
(f) Pitch of cell structure or picture element size=5 mm.
(g) Velocity of propagation depends on the grid line construction and the effect of the medium of the cell structure and has a maximum limit of $3 \times 10^{10}$ cm./second.
(h) Duration of pulses P$a$, P$z$=0.1 $\mu$second.
(i) Duration of pulses P$\alpha$, P$\Omega$ varies between 0.1 $\mu$second and 1.0 $\mu$second dependent on modulation.

Since the 405-line scan is horizontal, pulse P$a$ has to traverse a previously lit cell such as X1 before reaching and exciting a selected cell (e.g. X0). However, the voltage of 15 volts is far from sufficient to affect the cell X1 in spite of any ionization which may remain therein due to display of the preceding picture element 16 $\mu$seconds previously. The other pulse P$z$ on the same line MN should give up its energy in the process of causing a discharge through the gas of cell X0, as is true of the pulses P$\alpha$, P$\Omega$. However, if such energy absorption is incomplete, residual energy from pulse P$z$ may overshoot from cell X0 into cell X1, but the amplitude thereof will have been materially reduced. However, even if the leading edge of pulse P$z$ were to overshoot with full amplitude, as may happen due to harmless inaccuracies of timing, the combined amplitude of pulses P$a$+P$z$ will only provide 30 volts which is much lower than the minimum burning voltage of 75 volts.

As regards pulses P$\alpha$ and P$\Omega$ on line $\alpha\Omega$, the same considerations do not arise in relation to neighbouring cells in a vertical column since such cells (e.g. X3 and X4) have not been lit since scanning of the previous raster line and therefore no ionization persists therein. Thus, in the event of overshoot or inaccurate location of the interception, the combined amplitude of the two intercepting pulses, P$\alpha$, P$\Omega$ will only be 80 volts as compared with the striking voltage of 100 v. Thus higher amplitudes may be tolerated on line $\alpha\Omega$, moreover, in certain circumstances longer pulse durations may also be tolerated on line $\alpha\Omega$, and for these reasons pulses P$\alpha$, P$\Omega$ have been chosen for pulse width modulation between limits of about 0.1 and 1.0 $\mu$s. whereas pulses P$a$, P$z$ are of constant minimum width and serve mainly for marking the position of the desired picture element.

A method of producing suitably timed pulses for such a 405-line scan will now be described as an alternative to the method already described with reference to the device A$t$—Z$t$ of FIG. 3.

Visualizing the scan firstly as applied for simplicity to a single horizontal raster line represented by a single straight delay line, it will be appreciated that a train of pulses such as P$a$ or P$z$, must be fed to each end of such delay line and that each pulse train should be of constant pulse recurrence frequency (P.R.F.), the two frequencies being of slightly differing values so as to cause successive interceptions to occur at successive equally spaced points on the line i.e. at successive picture elements. More precisely, the right-hand or P$z$ train of pulses should have a P.R.F. slightly lower than that of the left-hand or P$a$ train of pulses if the point of interception X is to move from left to right as desired, the two frequencies having equal frequency spacing from a frequency of 60 kc. determined by the picture element scanning time of 16 $\mu$s. With the picture dimensions and data given by way of example, these two frequencies are 60 kc.$\pm$F where F=3 c.p.s. approximately.

A further requirement is of course that the initial pair of pulses P$a$, P$z$ should have the correct phase or time relationship to obtain an initial interception at the first picture element of the line. For this purpose two suitably interlocked pulse generators could be used, the interlock merely ensuring such correct phase relationship of the first pair of pulses, all subsequent pairs being timed automatically by the frequency difference between the two generators.

A similar principle may be employed for scanning more than one line.

Taking one of the two grids, say the horizontal grid AZ, in closed circuit systems it may be acceptable to have a zig-zag form of scanning following the grid with alternate left-to-right and right-to-left line scans. Pulses for such scanning may readily be obtained with two pulse generators each having a fixed frequency and the two frequencies differing by an appropriate amount. In such a system line blanking periods and line synchronisation signals may be dispensed with.

However, e.g. if left-to-right scanning is required for all lines, this cannot be done with the single zig-zag grid of FIGURE 1 since on alternate lines the scanning motion would be in the reverse direction. However, the problem may be resolved by providing two separate interleaved zig-zag grids for each frame as shown schematically in FIGURE 6 and switching the pulse generators from one grid to the other at line frequency so that forward or left-to-right scanning motion is obtained on all lines. Each grid AZ or A'Z' has (nominally) about 101 forward or operative lines and 101 return lines.

In FIGURE 6 the two generators 56, 57 are shown together with their starting interlock system $St$ and the two zig-zag delay lines AZ, A'Z' are shown interleaved and connected to the generators through two-way switches 58, 59 respectively. Of course, such switches will in fact be interlocked multivibrator type circuits synchronized to the line frequency by a device $Sw$. The return grid lines such as BC or B'C' are not used for the scan and are preferably located on a separate plane so as to be out of contact with the gas in the gas-filled envelope 51 of FIG. 4.

If the single line progression described above is applied to the first line AB of the upper grid, switching must take place when the scan has reached the point B since otherwise a reversed succession of interceptions would occur along the unused return line BC. However, mere switching to the grid A'B' will not suffice since succeeding pulses are so phased as to intercept beyond point B' on the return line B'C'. Therefore, a short delay element 61 must be inserted in series with the line A'B' so that the first interception will occur at the point A' as desired. Such delay is out of contact with the gas and should correspond to one grid line and may of course be a lumped delay such as an LC network. For the same reasons, and to keep the total length of line constant, a corresponding delay 62 is provided at the lower end of the upper grid AZ. The scanning motion will automatically progress from A' to B' thus scanning the second line of the frame, and when the point B' has been scanned, the generators are switched back to the upper grid so that point C will receive the next pulse interception as desired. As will be appreciated, a maximum period is available for each switching operation, such time being the line blanking period. The switching operation may be synchronized with a line synchronizing pulse if the system is not a closed circuit system. The pairs of pulses generated during the switching or blanking period are not wanted and should be prevented from reaching the grids by simultaneous switching or gating in circuits 63 and 64.

There is a further problem which does not arise with the time values laid down for this example, but could arise with shorter picture element scanning times if used with a switching system such as 58—59. In such circumstances, two separate pairs of pulses may overlap in time. Nevertheless, the latter possibility arises if the picture element scanning time is reduced below the value given above. With left-to-right line scanning the correct pair should appear at the grid terminals after each blanking period although such pair may be widely spaced in time if it is to intercept towards either end of the frame.

This problem may be solved e.g. in the following ways:

(a) The number of interleaved grids AZ, A'Z' is increased until each is short enough to be traversed in a time equal to the picture element scanning time. Thus the number of pulses $P\alpha$ or $Pz$ on the grid system at any instant is reduced to one, and it becomes again possible to suppress the unwanted pulse pairs by simultaneous gating of gate circuits 63, 64 controlled by the line synchronization signals. This permits the device $St$ to be used only at the start of each frame so that it may be set up for a single accurate starting delay value.

(b) The starting delay value of device $St$ may be varied in a linear manner line-by-line throughout the frame period. It can thus re-connect generators 56, 57 so that appropriate pulses appear with changing phase values at the start of each line instead of operating only at the start of a frame. This complicates the circuit but permits the use of the minimum number of two grids AZ, A'Z' for each frame.

(c) The device $St$ may be used only at the start of each frame, means being provided to suppress the unwanted pulses by a counting process so that an equal number of pulses is suppressed from both trains.

The increase in the number of interleaved delay line grids required by (a) above is advantageous inasmuch as it permits pulses of longer duration, and therefore greater energy content, to be fed into the system without risk of unwanted ignitions. Moreover, each delay line which is out of use may be earthed by the switching system thereby providing additional screening between the selected gas cell and neighbouring gas cells. On the other hand, it may be possible to halve the number of grids required under (a) by reversing the polarity of alternate pairs of pulses.

The latter principle may be used more generally to avoid unwanted interceptions.

In the present example, the vertical grid $\alpha\Omega$ requires modified pulse generating and controlling circuitry, or a system such as that of FIG. 3, since successive interceptions are separated by a length of delay line equal to the vertical dimension of the picture. As aforementioned, the pulses $P\alpha$, $P\Omega$ are chosen to carry the video modulation, and this is effected by pulse width modulation applied to the trailing edges of said pulses.

In an alternative choice of pulse values, the pulses of larger width and amplitude may be the pulses $Pz$ and $P\Omega$ on the grounds that these two pulses can approach the interception point X0 without meeting any cells having residual ionization. The latter possibility arises if the picture element scanning time is reduced below the value given above. With left-to-right line scanning, the directions of approach of these pulses (from the right and from below respectively) are generally opposite to the direction of the scan, the latter proceeding downwards and from the left.

It should further be observed that, although very high maximum pulse durations are envisaged, and although such pulses would each occupy many grid lines with the picture dimensions suggested, no more than two out of four pulses can perform spurious (and ineffective) interceptions in any part of the grid system. This is true even in cases where two or more pulses of one kind are present simultaneously on the grid system.

Visible light for the picture may be obtained either by light emitted from the discharge itself or by a phosphor layer $Ph$ activated by such discharge, or by a combination of the two.

If, as suggested above, a device equivalent to the transmitter grid $At$, $Zt$ of FIGURE 3 is used in a closed circuit system to generate pulses having appropriate phasing for scanning a display device, the physical dimensions of the delay line $At$, $Zt$ may be much smaller than those of the display grid provided that the velocity of propagation on grid $At$, $Zt$ is proportionately reduced. Thus a scanned area such as $At$, $Zt$ may be reproduced in an enlarged form e.g. on a grid of a receiver or display device such as that of FIGURE 4. Similarly, a display device such as that of FIGURE 4 may be used as an indicator panel and may, for example, be controlled e.g. manually by a transmitter equivalent to the device $At—Zt$ constituted by a short graduated magnetostrictive delay line. Such line may be one straight length provided with a slidable exciting coil which can be placed at any desired graduation mark corresponding to a particular gas cell on the panel.

In the examples using a delay line grid, it may sometimes be of advantage to incorporate loading inductances and/or capacitors at the ends of the grid lines, which may in fact be physical extensions of the grid lines themselves. With crossed grids such as those of FIGURE 2 the electrical lengths of these loading reactances may be varied, e.g. in a continuous progression along one or more sides of the grid, in order to reduce the likelihood of unwanted pulse interceptions.

The invention may also be applied to information storage using storage elements of the saturable magnetic core type. In this case such elements are the elements which are to be selected or scanned and, using, for example the principle of FIGURE 1, the elements are set up at points along the zig-zag grid. Then by suitable timing of the pulses $Pa$, $Pz$ applied at ends A, Z it may be arranged that one pair of these pulses intercept at a desired magnetic element and induce magnetic flux in this element. The element may for example have a core of the material known as square loop ferrite. Then by having the two pulses of equal amplitude, this amplitude being adjusted so that the flux induced by it does not magnetically saturate said core while twice this amplitude does cause saturation, it is clear that only elements which have been traversed by two intercepting pulses $Pa$, $Pz$ will be left in the saturated state, while a pulse $Pa$ or $Pz$ alone will not change the state of said cores. In this way information in the form of binary digits may be stored on a line AZ with each position or element being capable of storing a "one" or a "zero."

For such storage applications the delay line AZ is preferably a slow electromagnetic line, the velocity being reduced by having a construction based on the use of lumped constants. The magnetic core storage elements may themselves contribute to such construction, and be the cores of the inductance elements of such a delay line. Although slow lines of this type have attenuation problems, these may be reduced by having repeater amplifiers along the delay line. With such lines $Pa$, $Pz$ may have durations of one microsecond, so that a twenty-five element line would require twenty-five micro-seconds to read in each digit. The line delay time is also twenty-five microseconds. Read-out may be achieved by applying one pulse at one end of the line and having a read-out wire or other means threading said cores in sequence so that the read-out pulse traversing the whole delay line reproduces all the information in the twenty-five element line in twenty-five microseconds.

Although all the preceding description is based on the need for avoiding or rendering ineffective spurious pulse interceptions so that one single position or element may be selected, there are particular applications in which it is convenient to utilize groups of interceptions each of which groups is produced by a single set of pulses.

Thus, according to a modification of the invention, the pulses of a set are so timed in relation to each other and to their respective velocities of propagation as operatively to intercept each other at a plurality of sections of the delay line system or of the respective delay line paths so as to select or scan a desired group of positions or elements.

Thus, for example a crossed grid arrangement of the type shown in FIGURE 2 readily allows, if made effectively rectangular, a pair of pulses such as $Pa—P\alpha$ to provide a group of successive interceptions along a diagonal which may be selected by appropriate phasing of the pulse pair. A direct equivalent of such an arrangement may be constituted by two slow electromagnetic delay lines each having lumped constants and tapping points therebetween. A set of parallel branch conductors may be connected to each of the two sets of tappings, the two sets of conductors being arranged so as to intersect each other operatively to form a crossed grid; an example of this arrangement is described in copending application Serial No. 554,317, filed December 20, 1955, now U.S. Patent 2,890,378, issued June 9, 1959, the arrangement being used in that example for selecting one cathode ray beam unit from a row of 36 such units. To permit the use of short delay lines said 36 units are interconnected so that in effect they are served by a grid controlled by two delay lines (D1 and D2) each having a delay time corresponding approximately to at least six times the selection time of one beam unit. Selection is effected by applying the travelling pulse voltages simultaneously to electrode A1 and A2 and each pair of said electrodes may be regarded as being connected to the branch conductors at a selected intersection thereof.

To allow a selection of all 36 cathode ray beam units in sequence, it is necessary after the first six units (1–6) have been selected by one pair of pulses as just described, to delay the timing of one of the next or second pair of pulses with reference to the other, while connecting the A1 and A2 electrodes of the next six cathode ray beam units to the delay lines D1 and D2 so as to be positionally delayed in such manner that the second pair of pulses now select in sequence the cathode ray beam units 7–12. This process of combined time delay of pulses and positional delay of anodes A1, A2 is then continued progressively for successive beam unit groups. Relative time delay of pulses requires that the two delay lines have unequal lengths to avoid unevenly timed selection of the beam units. Thus the pulse of one pair which is delayed in time is applied to the longer of the two delay lines the excess in length of which is made equivalent to the time delay between the said pulses. For some purposes, the said excess may be greater. In this case the pulse on the longer line is delayed by a correspondingly greater amount to avoid the occurrence of two pulses on the line which otherwise would result in simultaneous selection of two pairs of A1 and A2 electrodes instead of one pair.

What is claimed is:

1. Apparatus for selecting from a plurality of positions or elements or for scanning a plurality of positions or elements, comprising a delay line system having delay sections each associated physically with one of said positions or elements, said system having at least two opposite input terminals with each pair of opposite input terminals being interconnected through said sections, means for applying a set of individual pulses one to each of said input terminals for selecting one of said positions or elements, the pulses of said set being so timed in relation to each other and to their respective velocities of propagation as operatively to intercept each other in said delay line system at the section of the delay line system associated physically with the desired position or element, two opposing sets of pulses traveling in opposite directions along one delay path, and means positioned at said position or element adapted to discriminate between the combined effect of a simultaneous presence said pulses and either of said pulses separately.

2. Apparatus according to claim 1, wherein the said input terminals are the opposite ends of a single delay line providing one transmission path for pulses fed to one input terminal and a second path in the opposite direction for pulses fed to the other input terminal.

3. Apparatus according to claim 3, wherein said delay line is folded substantially in a plane so as to permit selection from an array of positions or elements arranged at said plane.

4. Apparatus according to claim 1, wherein the speed of the propagation along said delay line and the duration of the pulses are chosen such that the length of line occupied by a pulse is substantially equal to the length of a section of line associated with one position or element.

5. Apparatus according to claim 1, wherein the velocity of propagation along the line and the duration of the pulses are chosen such that each pulse occupies a length of line greater than the length of a section of line associated with one position or element, the leading edges of the pulses being timed to intercept each other at the desired position or element and wherein a device capable of absorbing the energy contained in said pulses is coupled to said line at said one position or element.

6. Apparatus according to claim 1 comprising a first line, a second line separate from said first line but operatively intersecting said first line at a plurality of sections thereof each corresponding to a position or element, and means for supplying a set of at least two pulses, one to an end of each line, so timed that the pulses of a set intercept each other at one desired position or element.

7. Apparatus according to claim 6 wherein each of said lines is folded substantially in a plane so as to permit selection from an array of positions or elements arranged at said plane, said positions or elements being located at the operative intersections of the two folded lines.

8. Apparatus according to claim 6 wherein the velocity of propagation along at least one line and the duration of a pulse thereon is chosen such that said pulse occupies a length of line greater than the length of a section of line associated with one position or element, whereby each set of pulses provides interceptions at only one selected position or element located at an operative intersection.

9. Apparatus according to claim 1, including means for applying a holding-off bias over an area corresponding to that of substantially the whole delay line system, and means for removing said bias comprising means for producing a gating signal coincident in time with a desired pulse interception.

10. Apparatus according to claim 1, wherein at least one pulse of each set is modulated in duration, the time occurrence of the leading edge being unaltered.

11. Apparatus according to claim 1, wherein the means for applying pulses to the input terminals include a delay line path having the same total delay time as a delay path used for selecting positions or elements.

12. Apparatus according to claim 1, wherein the discriminating means at each position or element comprises a gas discharge cell forming part of a multiple cellular display device.

13. Apparatus as claimed in claim 1 wherein the discriminating means at each position or element comprises an information storage element having two stables states, the combined effect of said pulses determining one of said states but either of said pulses being insufficient alone to cause removal from the other stable state.

14. Apparatus as claimed in claim 1, wherein the pulses of a set are so timed in relation to each other and to their respective velocities of propagation as operatively to intercept each other at a plurality of sections of the respective delay line paths so as to select or scan a desired group of positions or elements.

15. Apparatus as claimed in claim 14 wherein different groups of positions or elements are scanned by different corresponding pairs of pulses, said pairs having different time intervals between pulses in a pair.

16. Apparatus as claimed in claim 15 comprising two electro-magnetic delay line paths which have different electrical lengths, wherein any pulse of a pair which is delayed in relation to its cooperating pulse is applied to the delay line path of greater electrical length, the cooperating pulse being applied to the other delay line path.

References Cited in the file of this patent

UNITED STATES PATENTS

| | | |
|---|---|---|
| 1,754,491 | Wald | Apr. 15, 1930 |
| 2,021,010 | Jenkins | Nov. 12, 1935 |
| 2,049,763 | De Forest | Aug. 4, 1936 |
| 2,172,354 | Blumlein | Sept. 12, 1939 |
| 2,500,929 | Chilowsky | Mar. 21, 1950 |
| 2,698,915 | Piper | Jan. 4, 1955 |
| 2,818,531 | Peek | Dec. 31, 1957 |
| 2,851,634 | Kazan | Sept. 9, 1958 |
| 2,858,480 | Shadowitz | Oct. 28, 1958 |